United States Patent
Stopczynski

(10) Patent No.: US 7,612,658 B2
(45) Date of Patent: Nov. 3, 2009

(54) SYSTEM AND METHOD OF MODIFYING PROGRAMMABLE BLIND SPOT DETECTION SENSOR RANGES WITH VISION SENSOR INPUT

(75) Inventor: Lawrence Gerard Stopczynski, Milford, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 376 days.

(21) Appl. No.: 11/786,244

(22) Filed: Apr. 11, 2007

(65) Prior Publication Data

US 2008/0252482 A1   Oct. 16, 2008

(51) Int. Cl.
*B60Q 1/00* (2006.01)

(52) U.S. Cl. .......... 340/436; 340/903; 701/301

(58) Field of Classification Search .......... 340/436, 340/903, 935, 937, 942, 425.5, 438, 435; 701/301; 342/70
See application file for complete search history.

(56) References Cited

U.S. PATENT DOCUMENTS

| | | | |
|---|---|---|---|
| 5,424,952 A | | 6/1995 | Asayama |
| 6,038,496 A | * | 3/2000 | Dobler et al. .............. 701/3 |
| 7,038,577 B2 | * | 5/2006 | Pawlicki et al. .......... 340/435 |
| 7,504,986 B2 | * | 3/2009 | Brandt et al. ............. 342/70 |
| 2005/0228588 A1 | | 10/2005 | Braeuchle et al. |

* cited by examiner

*Primary Examiner*—Toan N Pham
(74) *Attorney, Agent, or Firm*—Frank MacKenzie; Ford Global Technologies, Inc.

(57) ABSTRACT

A continuously programmable Blind Spot Detection System for vehicles that use continuous vision sensor input to determine lane offset and determine a maximum range limit for radar sensors to define an area of interest for declaration of objects within the blind spot area.

8 Claims, 3 Drawing Sheets

SYSTEM AND METHOD OF MODIFYING PROGRAMMABLE BLIND SPOT DETECTION SENSOR RANGES WITH VISION SENSOR INPUT

TECHNICAL FIELD OF THE INVENTION

The present invention relates to a continuously programmable Blind Spot Detection System that uses continuous vision sensor input to determine lane offset and determine a maximum range limit for radar sensors to define an area of interest for detection of objects within the blind spot area.

BACKGROUND OF THE INVENTION

Blind Spot Detection System sensors have programmable range capability that allows them to define a specific region of interest for detection of vehicles within the blind spot areas. Lane departure warning systems utilize a vision sensor for determining host vehicle offset to lane markings on the road. Blind Spot Detection Systems with programmable range capability have set a fixed programmable maximum limit to avoid false detection of objects in the lane or road beyond the adjacent lanes, such as guardrails, vehicles in lanes beyond the adjacent lane to the host vehicle, etc. When the host vehicle which is equipped with a Blind Spot Detection System drifts within the lane markers of the lane within which it is traveling, the maximum range limit of the host vehicle can extend beyond the far adjacent lane marker into the road edge or lane beyond the adjacent lane and yield false detections.

By utilizing the vision sensor for the lane departure system, it is possible to modify the programmable Blind Spot Detection System maximum ranges so as to minimize false detections as the vehicle travels down the road.

BRIEF SUMMARY OF THE INVENTION

In one aspect, the present invention is directed to a programmable Blind Spot Detection System for host vehicles having an ECU with a memory and further equipped with an external vision system. The system comprises a Blind Spot Detection System equipped with radar sensors having multiple beam selection control and programmable range capability to allow said radar sensors to define a specific region of interest for detection of vehicle within a blind spot area; and a lane departure warning system having a vision sensor for determining host vehicle offset to road lane markings, edge of road, guard rails or other obstacles. Advantageously, the multiple beam selection control has a separate programmable maximum range limit and preferably, each beam overlaps. The blind spot detection radar sensors are preferably continuously programmable, based upon vision input from the Lane Departure Warning System.

In another aspect, the present invention relates to a programmable Blind Spot Detection System for host vehicles having an ECU with a memory and further equipped with a Lane Departure Warning System having an external vision system wherein said Blind Spot Detection System programmable range capability is set as a programmable maximum range limit to avoid false detection of objects in the road beyond the adjacent lane. Preferably, the Lane Departure Warning System visually detects the lane marker offset (the distance between the side of the vehicle and the same-side lane markers, perpendicular to the direction of the lane and vehicle travel) as measured by the vision sensor and the lane offset is used to continuously modify the blind spot programmable maximum range settings to ensure blind spot detection capability does not extend beyond desired zone boundaries.

DETAILED DESCRIPTION OF THE INVENTION

Figure 1:
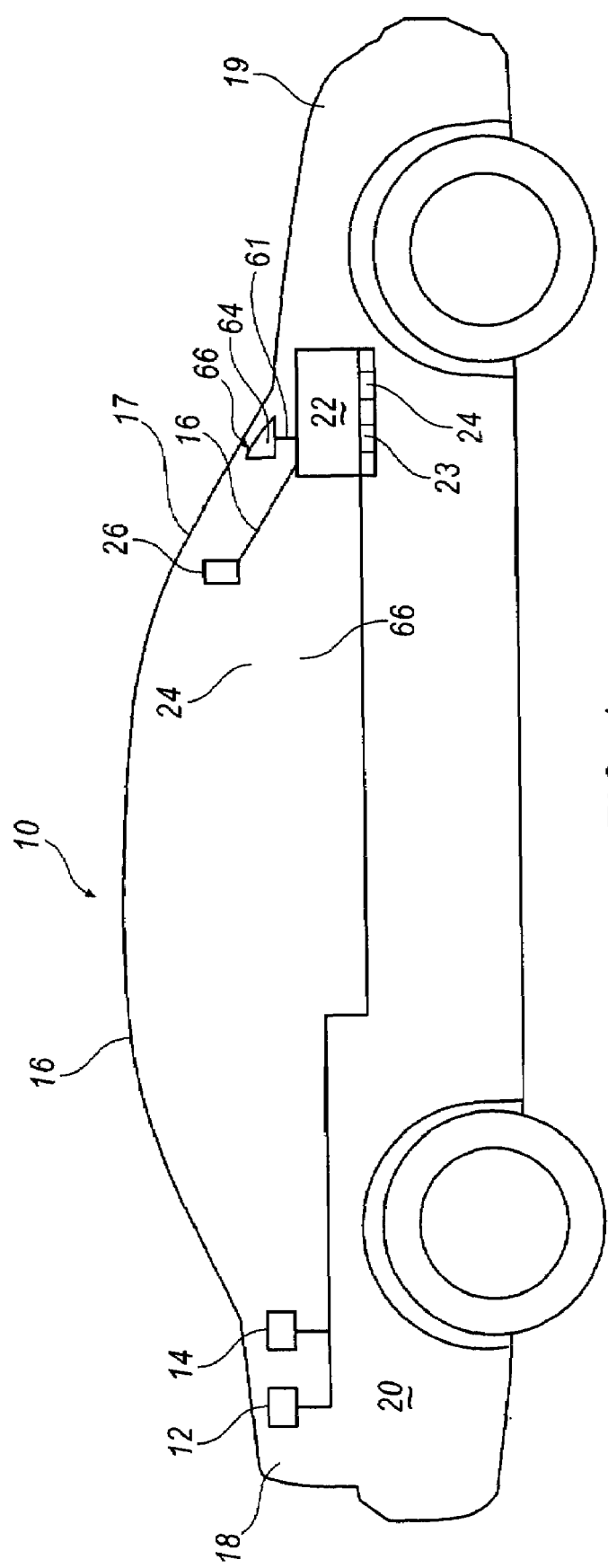
FIG. 1 is a schematic representation of a block diagram of the apparatus system of the present invention.

Turning now to the drawings wherein like numbers depict like structures, and particularly to FIG. 1, system 10 is comprised of at least two radar sensors 12, 14, which may be positioned on a host vehicle 16, such that it is in the rear 18 and sides 20 of the vehicle so that any blind spot is under surveillance. While one side of a vehicle is discussed, it is apparent to those skilled in the art that both sides of the vehicle are equipped with identical structures that mirror each other. The input from the radar sensors is transmitted to an electronic control module (ECU) 22 with memory 23. The ECU has a memory such as PROM, EPROM, EEPROM, Flash, or any other memory, and various tables are contained therein wherein maximum and minimum ranges are stored. The Blind Spot Detection System of the present invention also includes input from a Lane Departure Warning System to assist in continuously determining Maximum Range Limits for the Blind Spot Detection System. The Lane Departure Warning System is a vision system usually mounted on the front of the vehicle and oriented to look forward so that the vision sensors can detect lane markers on the road in front of the vehicle. In addition to lane markers, the vision sensors can also detect guard rails, edge of road and any other obstacles in the vehicle path. The vision sensors transmit data to the ECU wherein the lane offset is determined. Lane offset is defined for purposes of this application as the distance between the side of the vehicle and the same side lane markers, perpendicular to the direction of the lane and vehicle travel. The lane offset is continuously computed as the vehicle travels in a lane, and is used to continuously modify the Maximum Range Limit of the radar sensed beam which, if an object is detected within the continuously programmable Maximum Range Limit, an alarm is activated. The lane offset is continuously computed and stored in the ECU and continuously modifies the radar sensor range so that the Lane Offset as continuously determined by the ECU effectively becomes the Maximum Range Limit for the radar sensors within which an object will elicit an alarm. Specifically, as the radar sensor data are received, the distances to the objects as determined by the radar sensors are compared against the various maximum distances as continuously determined by the lane offset and stored in the tables in the ECU. The ECU continuously computes the distance to an object as perceived by the radar sensor(s) and compares that distance against the maximum range limit as continuously computed by the ECU based upon continuous input from the vision sensor and stored in the tables in the ECU. If an object is determined to be within the maximum range, the ECU sends a signal to an alarm 26 which is electronically connected to the ECU and an operator can be alerted when an object within the maximum range is detected.

Figure 2:
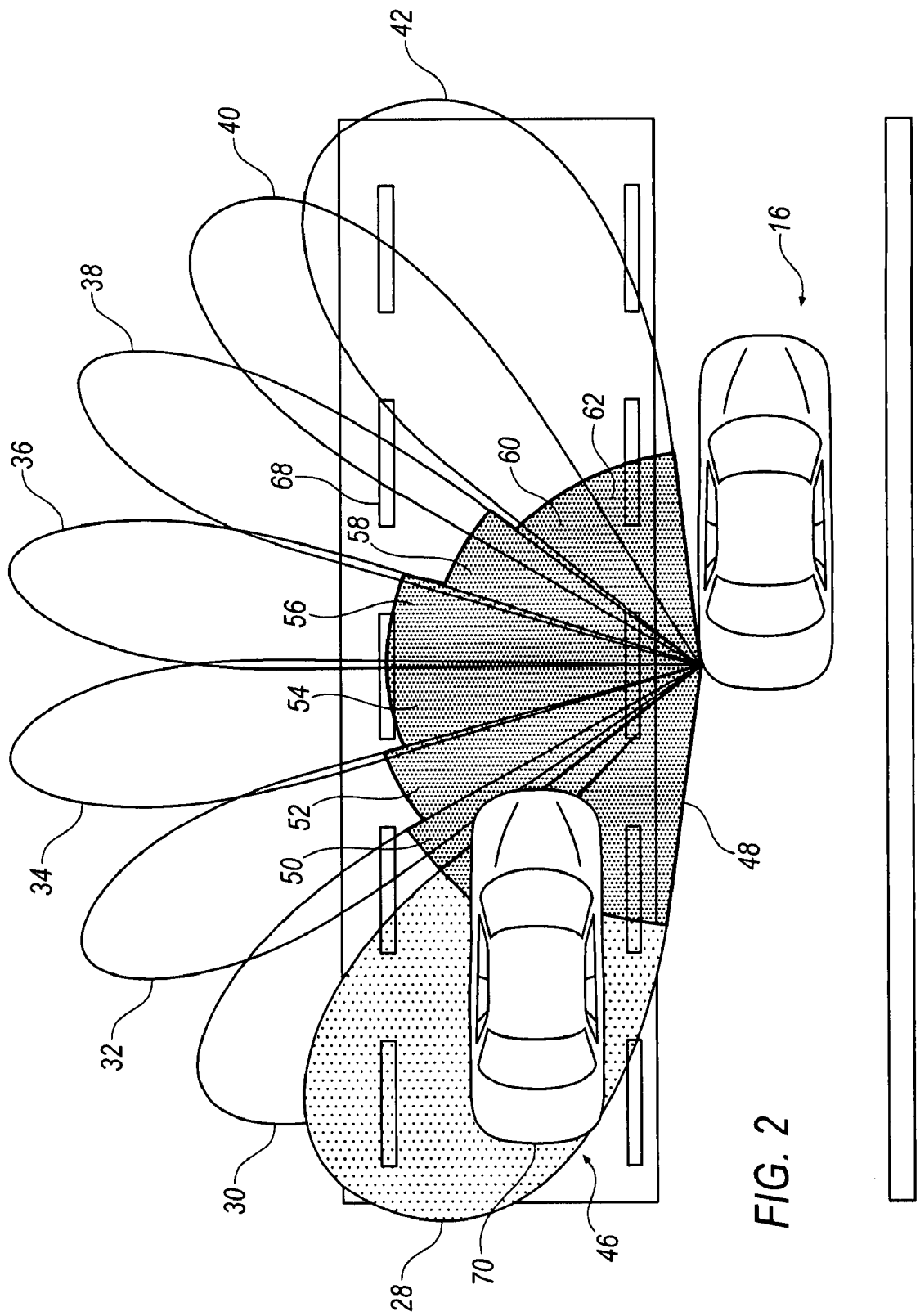
FIG. 2 is a schematic overview representation of a vehicle equipped with the programmable Blind Spot Detection System of the present invention traveling on a road showing the multiple beam and limited range of each such beam.

FIG. 2 is a schematic overview representation of a vehicle equipped with the programmable Blind Spot Detection System of the present invention traveling on a road showing the multiple beams and the limited range of each such beam.

Specifically, host vehicle 16 is shown with at least one radar sensor mounted on the rear and sides of the host vehicle. Those skilled in the art recognize that whereas structures on one side of the vehicle are described, identical structures may be and preferably are mounted on the opposite side of the vehicle. Multiple overlapping radar beams 28, 30, 32, 34, 36, 38, 40 and 42 are shown, emanating from the rear and along the side of the host vehicle to detect oncoming vehicle 44 as it approaches from the rear in an adjacent lane 46. Within each radar beam, continuously programmable Maximum Range Limits 48, 50, 52, 54, 56, 58 and 60 form a sub part of each multiple radar beam, and indicate the Maximum Range Limit as continuously programmed within the ECU for detecting objects in adjacent lanes of traffic in each of the beams. Each continuously programmable Maximum Range Limit is arranged in decreasing order to provide for an overall maximum range limit of the system that will facilitate detection of approaching objects.

In order to calculate the continuously programmable Maximum Range Limit for each of the radar beams, a vision sensor 64 is used such as one would expect with a Lane Departure Warning System 66. The Lane Detection Warning System is a vision based system that uses at least one vision sensor 64, usually located in the front 19 of the vehicle behind the windshield 17 to sense the lane markings 68, guard rails, edge of road or other obstacles. The vision system is electronically connected at 61 to the ECU and continuously senses actual images and transmits the vision data to the ECU which processes the image data such that the Maximum Range Limit is calculated to be no further than the lane markers 68 or guard rails (not shown) of the adjacent lane of traffic. Specifically, the vision sensor may use lane offset and continuously modify the Maximum Range Limit of the radar sensors of the Blind Spot Detection System. Any radar data beyond the continuously programmable Maximum Range Limits for the radar beams are ignored. Moreover, the Maximum Range Limit is constantly recalculated based upon the lane offset images processed so that as the host vehicle travels down a road, it senses when the lane markers are receding from the vision sensor view as the next lane markers are detected as arriving in each of the beams. As each lane marking, road edge or guard rail image comes into view, the Lane Offset is re-determined, and is processed by the ECU to continuously modify the Maximum Range Limit of the radar beams of the Blind Spot Detection System.

In one embodiment of the present invention, the operation of the Blind Spot Detection System may be explained in greater detail. Specifically, as host vehicle travels down a lane, the vision sensors detect the lane markings or guard rails or any other obstacle and continuously transmit such data to the ECU where it is processed and used to continuously modify the Maximum Range Limit of the radar beams of a Blind Spot Detection System. An object, such as vehicle 70 approaching a blind spot in the adjacent lane, is detected as a possible warning event when it enters into a beam, and intrudes into the maximum range limit and is detected as coming closer to the vehicle as it impinges within the maximum range area of the beams. As the vehicle 70 approaches the host vehicle, a determination is made whether the vehicle is a potential warning event when it is determined that the distance between the vehicle and the host vehicle becomes shorter whereupon at some point, the alarm is activated and the host vehicle operator is. Once the radar sensor indicates that the distance between the host vehicle and the perceived object has increased such that the perceived object is outside of the continuously programmable Maximum Range Limit, the alarm is deactivated. Those skilled in the art understand that the object may also be pedestrians, guard rails, debris, approaching vehicles in the same or an adjacent lane as the host vehicle, or any other object that may pose a potential hazard to the host vehicle.

Figure 3:
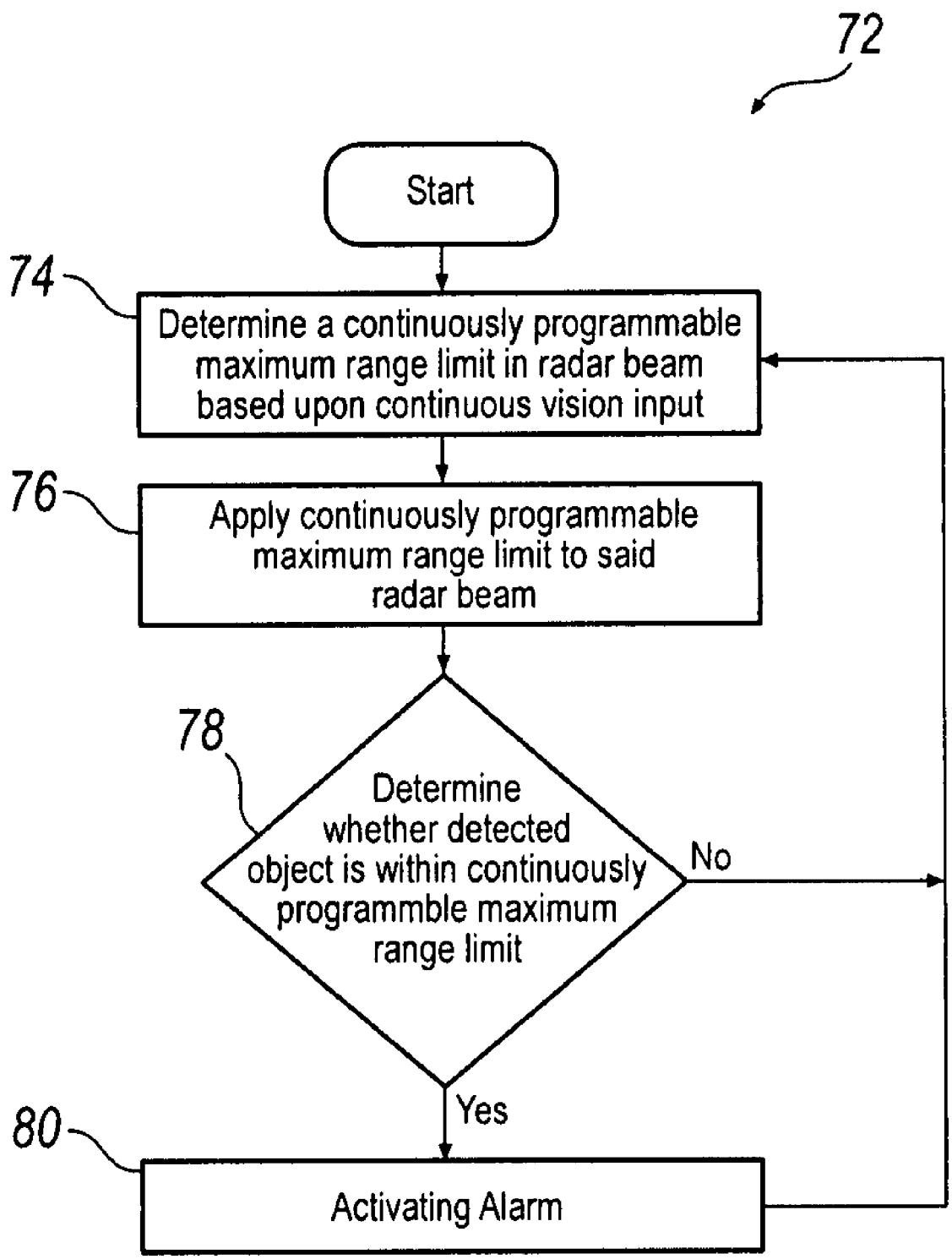
FIG. 3 is a schematic representation of a software flowchart showing the steps of the present invention.

FIG. 3 is a software flow chart of the method of modifying programmable blind spot detection radar sensor ranges with vision sensor input. Specifically, method 72 begins with step 74 which is determining a continuously programmable Maximum Range Limit for at least one radar beam based upon continuous vision sensor input. The step may be achieved by continuously determining lane offset based upon vision sensor input and inputting such lane offset into an ECU memory. Step 76 is applying a continuously programmable Maximum Range Limit to each radar beam. This step may be achieved by continuously determining a Maximum Range Limit in each of multiple radar beams in a Blind Spot Detection System based upon the lane offset. Step 78 is determining whether a detected object is within the continuously programmable Maximum Range Limit of at least one of the radar beams. If yes, Step 80 activates an alarm to alert an operator and the software loops back to Step 74. If no, the software deactivates the alarm and loops back to step 74.

While the invention has been described using particular words, those skilled in the art understand that the words utilized above are words of description and not words of limitation. Many variations and modifications are possible without departing from the scope and spirit of the invention as set forth in the appended claims.

What is claimed as new and desired to be protected by Letters Patent of the United States is:

1. A programmable Blind Spot Detection System for host vehicles having an ECU with a memory and further equipped with an external vision system, comprising:
   a lane departure warning system having at least one vision sensor for continuously sensing lane offset data for said host vehicle; said lane offset data continuously transmitted to said ECU to continuously determine lane offset as said host vehicle travels in a lane;
   a Blind Spot Detection System equipped with at least one radar sensor, each said radar sensor projecting a radar beam overlapping with an adjacent radar beam and transmitting radar data to said ECU; each said radar beam having a continuously programmable Maximum Range Limit as continuously determined by the ECU in response to said continuously determined lane offset to warn an operator when an object is detected within said continuously programmable Maximum Range Limit.

2. The programmable Blind Spot Detection System of claim 1, wherein said object may include vehicles in a lane adjacent said host vehicle, debris, pedestrians.

3. The programmable Blind Spot Detection System of claim 1, wherein each said beam selection has a separate programmable maximum range limit.

4. The programmable Blind Spot Detection System of claim 1, wherein each separate programmable maximum range limit in each beam is in decreasing order.

5. The programmable Blind Spot Detection System of claim 1, wherein said vision system lane marker offset continuously modifies said blind spot programmable range settings to ensure blind spot detection capability extends to an adjacent lane and not beyond.

6. A method of modifying continuously programmable blind spot detection radar ranges with vision sensor input in a host vehicle, comprising:

determining a continuously programmable Maximum Range Limit in at least one radar beam based upon continuous vision input;

applying said continuously programmable maximum range limit to at least one radar beam;

determining whether a detected object is within the continuously programmable maximum range limit for said radar beam;

generating an alarm.

7. The method of claim 6, wherein said vision input is continuously determining lane offset based upon vision sensor input and inputting such lane offset into an ECU memory.

8. The method of claim 6, wherein the ECU continuously determines a Maximum Range Limit in each of multiple radar beams in a Blind Spot Detection System based upon a continuous determination of lane offset.

* * * * *